March 20, 1962    L. B. COURTOT ET AL    3,026,129
SWIVEL JOINT WITH HELICALLY WOUND FLEXIBLE
HOSE ATTACHED TO HOUSING MEMBERS
Filed Nov. 20, 1958
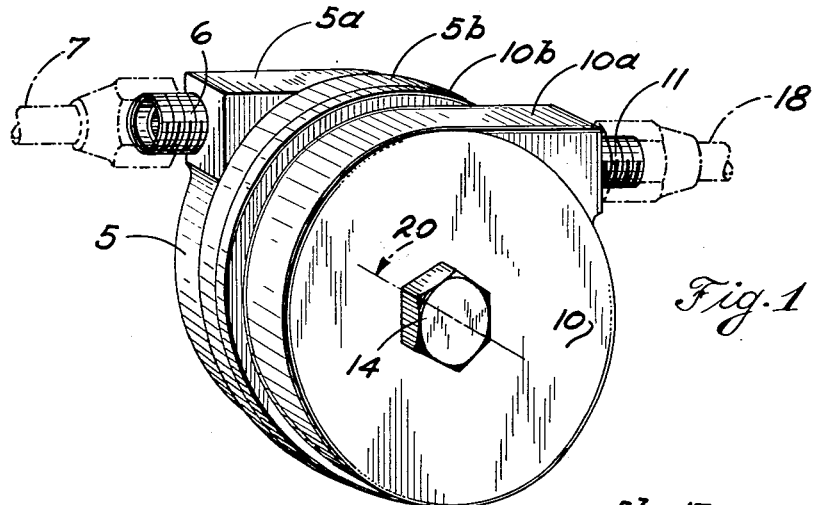
Fig. 1
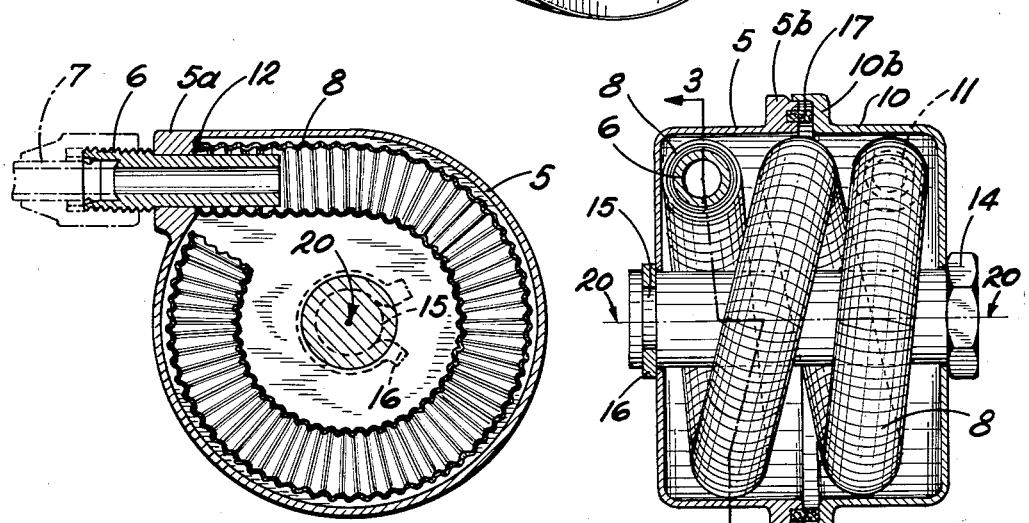
Fig. 3
Fig. 2
INVENTORS
LOUIS B. COURTOT
& FREDERICK R. ALLIN.
BY
RICHEY, McNENNY & FARRINGTON
Donald W. Farrington
ATTORNEYS

United States Patent Office 3,026,129
Patented Mar. 20, 1962

3,026,129
SWIVEL JOINT WITH HELICALLY WOUND FLEXIBLE HOSE ATTACHED TO HOUSING MEMBERS
Louis B. Courtot, Euclid, and Frederick R. Allin, Chesterland, Ohio, assignors to The Weatherhead Company, Cleveland, Ohio, a corporation of Ohio
Filed Nov. 20, 1958, Ser. No. 775,298
4 Claims. (Cl. 285—184)

This invention relates to swivel joints for conduits and more particularly to a swivel joint suited for high temperature use.

It is frequently necessary to connect conduits to each other in a manner so that one conduit may swing or swivel with respect to the other. In the event the fluent materials being conducted through the conduits are at relatively low temperatures, such as 200° F., the problem is relatively simple in that leather or synthetic rubber seals or gaskets may be employed at the swivel joint to effectively seal the joint against loss of pressure. With the advent of high speed aircraft and the higher temperatures and pressures being encountered, there is a need for a swivel connection between two conduits which will operate satisfactorily at higher temperatures and pressures such as, for example, 3000 pounds per square inch at 1000° F.

It is among the objects of our invention to provide a swivel device which eliminates all sliding fit metal contact and which eliminates all gaskets or synthetic rubber seals and wherein the swivel joint is not adversely affected by high temperature conditions.

It is a further object of our invention to provide a swivel joint effective at high operating temperatures and pressures wherein a length of corrugated metal tubing is wound in a helical path about the swivel axis and wherein the swiveling motion is accommodated by either a change in the diameter of the helix and/or by an axial flexing of the walls of the corrugated metal tubing to change its length without a change in the diameter of the helix.

It is a further object of our invention to provide a high temperature swivel joint wherein complementary cylindrical metal cups are arranged with the edges of the open ends of the cups adjacent each other and wherein one of said metal cups is provided with an inlet fitting and the other of said metal cups is provided with an outlet fitting and wherein the inlet fitting and the outlet fitting are connected to each other by a helix wrap of corrugated metal tubing housed within the cups.

Further objects and advantages relating to efficiency in operation, low-cost construction and ruggedness in use will appear from the following description and the appended drawings wherein:

FIG. 1 is a perspective view of a swivel joint made according to our invention;

FIG. 2 is a transverse elevation with parts in section of the swivel joint; and

FIG. 3 is an elevation with parts in section as indicated at 3—3 of FIG. 2.

Referring to the drawings, an inlet housing 5 is fitted with an inlet body 6 which is exteriorly threaded so as to be connected to an inlet pipe indicated at 7 in phantom outline. The inlet fitting body 6 is brazed or otherwise secured to the inlet housing 5 and projects within the housing so as to be received within the open end of a length of corrugated metal tubing 8.

A complementary outlet housing 10 is provided with an outlet fitting body 11 secured in the housing 10 substantially as the fitting body 6 is secured in the inlet housing 5. The other end of the corrugated metal tubing 8 is secured to the outlet fitting 11. Preferably each end of the corrugated tubing 8 is anchored to its fitting by solder or brazing as indicated at 12 in FIG. 3.

The casings 5 and 10 are generally cylindrical in shape and each casing is provided with a boss as at 5a and 10a so that the fitting body is generally tangent to the peripheral wall of the casing. The diameter of each casing is such that the flexible metal hose may be coiled therein with the inner diameter of the helix about twice the diameter of the flexible metal hose. When the fitting 11 and its casing 10 is turned clockwise relative to casing 5 the helix is either reduced in diameter or lengthened as may be determined by the construction of the coil and the pressure within the coil.

The corrugated tubing material 8 may be formed so as to provide either parallel corrugations or a spiral corrugation. Such material is both flexible and extensible and is formed so that the flexing motion and the change in length are accommodated by the folds or corrugations in the wall of the tubing. The corrugated tubing or flexible metal hose 8 is wound in a helix as best shown in FIG. 2 and the housings 5 and 10 are held in assembled relation enclosing the helically wound tube 8 by means of a bolt 14 which is provided with an annular groove 15 adapted to receive the fastener 16. Preferably a graphite gasket member 17 is carried by the flange 5b on the inlet housing 5 and projects so as to bear against an opposing face on flange 10b of the outlet housing 10.

The total axial extent of the chamber formed by the casing parts 5 and 10 is determined by the number of turns of the helix in the metal hose 8 and the hose diameter. For installations which require only a few degrees of swivel motion one helical turn will be sufficient. Where a wide angle of swivel motion is required a larger number of helical turns will be employed.

The outlet fitting 11 may be secured to a rigid pipe 18 as indicated in phantom outline in FIG. 1 and the two pipes 7 and 18 may be turned with respect to each other about the central axis 20 of the swivel joint. The swivel joint may be assembled with the pipes 7 and 18 extending in opposite directions as shown in FIG. 1. As the pipe 18 is turned with respect to the pipe 7, the corrugated tubing tends to wind about the bolt 14 to assume a smaller diameter helix. The flexibility of the tubing accommodates this reduction in helix diameter. Since the ends of the corrugated tubing are soldered or brazed to the inlet and outlet fittings 6 and 11 respectively, there are no moving parts which must be sealed with respect to each other to retain the fluid under pressure. The efficient operation of the swivel is not affected by high temperatures which would melt or destroy the leather or synthetic rubber seals employed in the prior art devices. The graphite ring 17 acts as a bearing facilitating the motion of one housing with respect to the other and in addition serves as a dirt barrier.

Although we have shown and described one form of our invention in considerable detail, it will be understood that numerous modifications may be made therein without departing from the scope of the invention as defined in the following claims.

What is claimed is:

1. A swivel joint for conducting fluent materials comprising a pair of confronting housing members coupled to each other for relative rotation about an axis extending centrally through said housing members, said housing members enclosing a chamber extending around said axis, an inlet fitting on one of said housing members leading into said chamber and offset from said axis, an outlet fitting on the other of said housing members leading from said chamber and offset from said axis, and a longitudinally extensible and contractible flexible hose within said chamber fixedly secured in sealing relationship at one end to said inlet fitting and extending through at least one full turn helically about said axis and fixedly secured in sealing relationship at its opposite end to said outlet fitting.

2. The swivel joint of claim 1 wherein each end of said hose extends tangent to the helix formed by the hose, and each fitting its connected rigidly to the respective housing member and extends coaxial with the respective hose end secured thereto.

3. A swivel joint for conducting fluids at high temperature comprising a pair of confronting cup-shaped housing members which together enclose a cylindrical chamber, said housing members being coupled together for relative rotation about the axis of said cylindrical chamber, a rigid inlet fitting fixedly mounted on one of said housing chambers and leading substantially tangentially into said chamber offset from radial alignment with said axis, a rigid outlet fitting fixedly mounted on the other of said housing members and leading substantially tangentially from said chamber offset from radial alignment with said axis, and a longitudinally extensible and contractible flexible corrugated metal hose within said chamber fixedly secured in fluid-tight relationship at one end to said inlet fitting and extending therefrom through at least two full turns helically about said axis and fixedly secured in fluid-tight relationship at its opposite end to said outlet fitting.

4. The swivel joint of claim 3 wherein there is provided connection means extending axially through said chamber inside the helix formed by the hose and coupling said housing members together rotatably, and wherein said hose in its normal position has the inside of its helix spaced substantially from said connection means and has an inside helix diameter substantially greater than the cross-sectional diameter of the hose, each end of the hose extends tangent to the helix formed by the hose, and each fitting extends coaxial with the respective hose end secured thereto.

References Cited in the file of this patent

UNITED STATES PATENTS

| | | |
|---|---|---|
| 1,417,459 | Cox | May 23, 1922 |
| 1,441,157 | Krenke | Jan. 2, 1923 |
| 1,765,693 | Muend | June 24, 1930 |
| 1,993,984 | Wulle | Mar. 12, 1935 |
| 2,068,876 | Snyder | Jan. 26, 1937 |
| 2,362,953 | Wedeberg | Nov. 14, 1944 |
| 2,406,234 | Marancik et al. | Aug. 20, 1946 |
| 2,420,053 | Muller | May 6, 1947 |
| 2,621,882 | Fletcher | Dec. 16, 1952 |

FOREIGN PATENTS

| | | |
|---|---|---|
| 6,918 | Great Britain | Dec. 31, 1909 |
| 113,906 | Austria | Mar. 15, 1929 |